Figure 1:
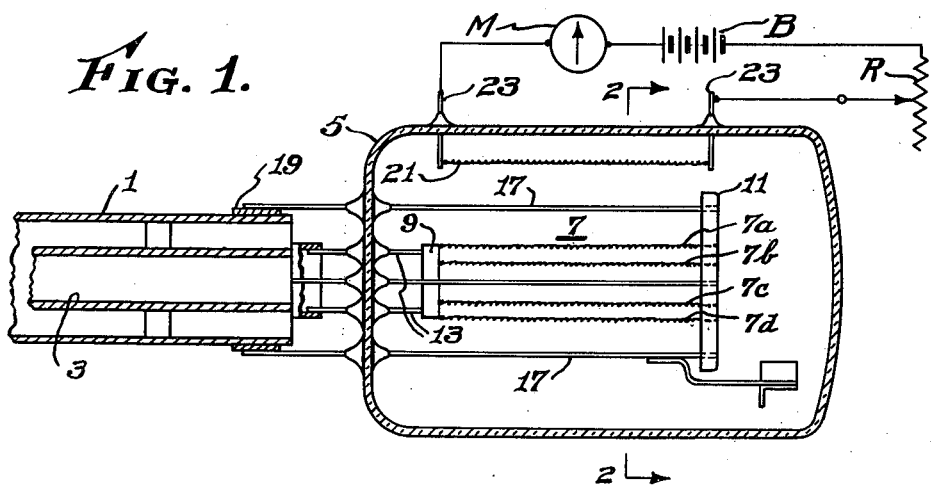

Oct. 16, 1945.  H. N. KOZANOWSKI  2,387,158
COAXIAL LOAD RESISTOR FOR ULTRA HIGH FREQUENCY MEASUREMENTS
Filed Feb. 25, 1942

Inventor
Henry N. Kozanowski
By C. D. Tuska
Attorney

Patented Oct. 16, 1945

2,387,158

UNITED STATES PATENT OFFICE 2,387,158

COAXIAL LOAD RESISTOR FOR ULTRA HIGH FREQUENCY MEASUREMENTS

Henry N. Kozanowski, Collingswood, N. J., assignor to Radio Corporation of America, a corporation of Delaware Application February 25, 1942, Serial No. 432,190

4 Claims. (Cl. 315—64)

This invention relates to load resistors and particularly to improvements in coaxial load resistors for measuring currents of ultra high frequencies.

In measuring the power output of ultra high frequency transmitters by absorption in a load resistor, two methods are in common use. The first method makes use of standard type incandescent lamps tapped across a section of matching line adjusted for maximum power output or minimum standing waves. The advantage of this method is that it gives practically instantaneous response during the adjustment of the transmitter. The electrical characteristics of standard lamps, however, are far from ideal because they behave more like lumped circuits and in general exhibit standing wave characteristics along the filament length. This results in non-uniform heating and makes photoelectrical output measurements open to serious errors. By way of example, a standard 110 volt, ten watt, lamp lights up quite uniformly at 400 megacycles, but has a resistance of 1200 ohms. If power of greater than 10 watts is to be measured, paralleling of lamps beyond, say, two, becomes very difficult due to lead lengths and capacity effects. The use of higher wattage lamps, for example, 120 volts, 25 watts, for loads at, say, 400 megacycles, brings out such non-uniform heating that they are almost useless for absolute power measurements.

The second method developed by George H. Brown (see U. S. Patent 2,262,134) uses a terminating resistor having a distributed inductance, resistance and capacitance per unit length, which, when appropriately chosen, will terminate a line of a given impedance over a wide frequency range. Cooling water passed over the resistor removes the dissipated power in the form of heat. When the rate of water flow and temperature rise are both known, the dissipated power can be calculated from the known electrical equivalent of heat. The Brown method, while basically accurate, requires in the case of small power, measurement of small temperature differences (about 5 degrees C. for 30 watts) and the accurate measurement of small rates of water flow. Further, the equipment especially for field work is cumbersome, difficult to handle and, unless specially arranged (differential thermocouples, etc.), requires several minutes for equilibrium to be attained after each adjustment when the power is applied.

Accordingly, the principal object of the present invention is to provide a simple, inexpensive and trouble free device for terminating a transmission line and one having the speed, convenience, and compactness of a lamp load without its disadvantages.

Another and important object of the present invention is to provide a comparator lamp wherein the comparator filament is electrically isolated from the main or load filament whereby reliable and accurate readings are ensured.

Figure 2:
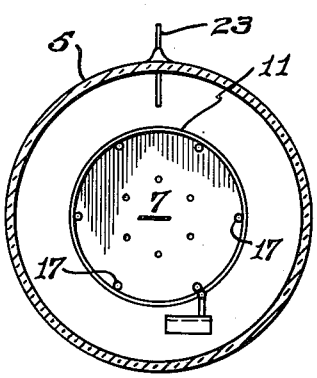
Figure 3:
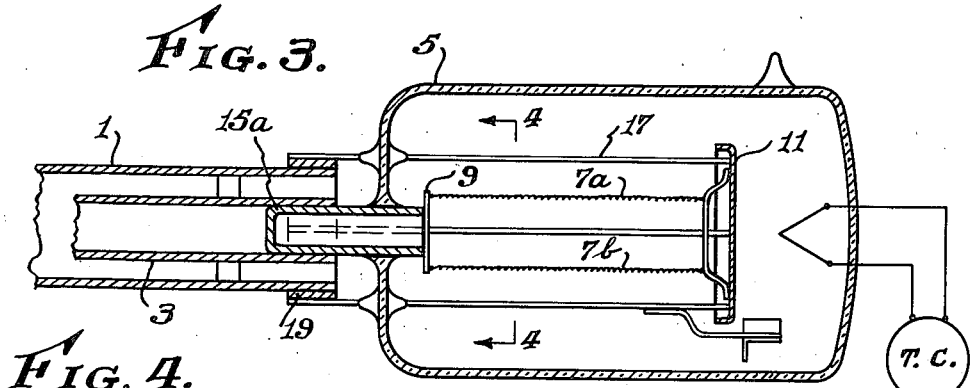
Figure 4:
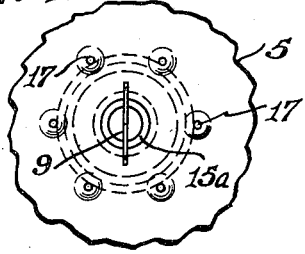

Other objects and advantages will be apparent and the invention itself will be best understood by reference to the following specification and to the accompanying drawing, wherein:

Figure 1 is a longitudinal sectional view of a load resistor constructed in accordance with the principle of the invention and containing a comparator filament, the device being connected in a suitable circuit, Figure 2 is a transverse sectional view taken on the line 2—2 of Fig. 1, Figure 3 is a longitudinal sectional view of a gas-filled device incorporating the invention and containing a thermally actuated measuring device, and Figure 4 is a fragmentary sectional view looking in the direction of the arrows 4—4 of Fig. 3.

In the drawing, wherein like reference characters designate the same or corresponding parts in all figures, I designates the outer conductor and 3 the inner, concentric, conductor of a conventional transmission line. This transmission line I, 3, is terminated by a load device, indicated generally at 5, which embodies the present invention.

The transmission line I, 3 has negligible resistance per unit length and therefore has a characteristic impedance:

$$Z_1 = \sqrt{L_1/C_1}$$

where $L_1$=inductance per unit length,
$C_1$=capacitance per unit length.

In one of its forms, the load device 5 has the characteristic of a uniform transmission line having high resistance per unit length and short circuited at the far end, said resistance imparted by conductor 7 (later described). The input impedance $Z_{in}$ of the load device 5 is caused to correctly terminate the conventional transmission line I, 3 by a suitable choice and dimensioning of the electrode structure of the load device. That is, $Z_{in}$ may be made substantially resistance and equal to $Z_1$ over a wide frequency band by a suitable choice of design constants involved in the equation:

$$Z_{in} = Z_c \tanh(\alpha h) = R_{in} + jX_{in}$$

where $Z_c$ = characteristic impedance of the load 5 considered as a transmission line with uniformly distributed L, C and R per unit length =

$$\sqrt{\frac{R+j\omega L}{j\omega C}} = Z_0\sqrt{1-jK}$$

where $Z_0$ = characteristic impedance of load 5 when $R=0$.

$$K = \frac{R}{L\omega}, \quad \omega = 2\pi \times \text{frequency},$$

$$\alpha = \frac{2\pi}{\lambda} j\sqrt{1-jK}$$

$\lambda$ = wavelength corresponding to frequency $f$, $h$ = length of transmission line load 5.

The teaching of U. S. Patent No. 2,262,134 to George H. Brown leads to a choice of constants:

$$f_0 \begin{cases} K=5 \\ h/\lambda_0 = 0.0535 \\ Rh = 1.68 Z_0 \\ \frac{R_{in}}{Z_0} = 1.75 \ (X_{in} \text{ negligible}) \end{cases} \quad (B)$$

where $f_0$ is a frequency lying within the band of frequencies over which the device 5 is to function as a termination of the concentric line 1, 3. Usually $f_0$ will be set equal to a frequency near the center of the band. $R_{in}$ is set equal to $Z_1$, the characteristic impedance of the line 1, 3. The configuration of the load device 5 is chosen so that L and C per unit length satisfies the equation $\sqrt{L/C}=Z_0$.

Referring first to the device of Figs. 1 and 2, here 5 designates a highly evacuated transparent envelope containing a resistance element 7 which comprises one or more helically wound incandescent filaments 7a, 7b, etc., arranged in circumferentially spaced array parallel to the long axis of the tube and anchored at their opposite ends to common supporting posts or discs 9 and 11, respectively. Obviously where, as in the instant case, the resistance device comprises a number of helically wound filaments, its effective inductance is greater than would be offered by the same structure using straight filaments and this fact should be considered in spacing of the said filaments and their supports so that the capacitance therebetween will be of a value calculated to give the desired impedance ($Z_{in}$).

The metal disc 9 to which the adjacent ends of the resistance elements 7a, 7b, etc. are anchored is connected to the inner conductor 3 of the transmission line by two or more parallel leads 13, of low resistance, which extend through the base of the envelope 5 and terminate in an external metal collar 15 which fits snugly about the end of said inner conductor 3. Alternatively, as shown in Fig. 3, the connection between the adjacent ends of the resistance elements 7a, 7b, and the inner conductor 3 may comprise a closed metal cylinder 15a which fits within the bore of the inner conductor 3 and extends through the base of the envelope 5.

The electrical path between the transmission line 1, 3, and the resistance elements 7a, 7b, etc. is completed through a number of leads 17 of low resistance, each of which is connected at one end to the metal disc 11 and at the other end to a collar 19 which fits about the outer conductor 1. In the illustrated embodiments of the invention there are six of the leads 17; they are mounted in circumferentially spaced parallel array about the resistance elements 7a, 7b, etc. and the inner leads 13. This arrangement of the outer leads 17 comprises an open-work shield or Faraday cage through which the incandescent resistance elements 7a, 7b, etc. may be observed for purposes of comparison with an auxiliary or comparator filament 21, which is mounted within the envelope, as on short leads 23, exterior of the cage.

An accurate indication of the power dissipated by the tungsten, carbon or other resistance elements 7a, 7b, etc. is ensured when the comparator filament 21, which is of the same material and diameter, is brought to the same degree of incandescence as the elements 7a, 7b, etc. by an auxiliary circuit which includes a battery B, rheostat R and meter M.

In the embodiment of the invention shown in Figs. 3 and 4, the comparator filament 21 (of Figs. 1 and 2) is omitted and the power dissipated by the resistance element 7 is transmitted in the form of heat through a suitable gas within the bulb to a thermocouple T. C. Various other modifications of the invention will suggest themselves to those skilled in the art. It is to be understood, therefore, that the foregoing is to be interpreted as illustrative and not in a limiting sense.

What is claimed is:

1. A load device for terminating a concentric line in its characteristic impedance, said device comprising a hermetically sealed transparent envelope containing a resistance element adapted to incandesce under normal load and providing a terminating resistance substantially equal to the characteristic impedance of said line, a plurality of leads symmetrically mounted about said resistance element and extending through a wall of said envelope, said leads and said resistance element comprising an electrical path possessing substantially uniform resistance, capacitance and inductance per unit length when subjected to currents of radio frequency whereby said device terminates said line in its characteristic impedance.

2. The invention as set forth in claim 1 and wherein said symmetrically mounted leads are circumferentially mounted about said resistance element and comprise a Faraday cage therefor.

3. A combined load resistor and comparator lamp comprising, a hermetically sealed transparent envelope containing an incandescent resistance element, means comprising an open-work Faraday cage about said resistance element and through which said element is visible, a second incandescent resistance element within said envelope exterior of said Faraday cage, and means extending to the exterior of said envelope through which said incandescent resistance elements may be separately energized.

4. The invention as set forth in claim 3 and wherein said Faraday cage extends to the exterior of said envelope and comprises the means through which said first mentioned incandescent resistance element is energized.

HENRY N. KOZANOWSKI.